US012027776B2

(12) United States Patent
Wang et al.

(10) Patent No.: US 12,027,776 B2
(45) Date of Patent: Jul. 2, 2024

(54) TERMINAL DEVICE

(71) Applicant: VIVO MOBILE COMMUNICATION CO., LTD., Guangdong (CN)

(72) Inventors: Yijin Wang, Dongguan (CN); Huan-Chu Huang, Dongguan (CN); Xianjing Jian, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 275 days.

(21) Appl. No.: 17/156,271

(22) Filed: Jan. 22, 2021

(65) Prior Publication Data

US 2021/0143523 A1 May 13, 2021

Related U.S. Application Data

(63) Continuation of application No. PCT/CN2019/097216, filed on Jul. 23, 2019.

(30) Foreign Application Priority Data

Jul. 24, 2018 (CN) ......................... 201810818722.6

(51) Int. Cl.
*H01Q 1/24* (2006.01)
*H01Q 13/10* (2006.01)
(Continued)

(52) U.S. Cl.
CPC ............. *H01Q 21/08* (2013.01); *H01Q 1/243* (2013.01); *H01Q 13/10* (2013.01); *H01Q 19/10* (2013.01)

(58) Field of Classification Search
CPC ............................... H01Q 1/243; H01Q 13/10
See application file for complete search history.

(56) References Cited

U.S. PATENT DOCUMENTS 8,963,785 B2 2/2015 Dong et al.
2010/0032001 A1 2/2010 Brantner
(Continued)

FOREIGN PATENT DOCUMENTS

CN 102119454 A 7/2011
CN 204538197 U 8/2015
(Continued)

OTHER PUBLICATIONS

International Search Report and Written Opinion of the International Searching Authority regarding International Application No. PCT/CN2019/097216, dated Oct. 10, 2019. Translation provided by Bohui Intellectual Property.
(Continued)

*Primary Examiner* — Daniel Munoz
(74) *Attorney, Agent, or Firm* — Harness, Dickey & Pierce, P.L.C.

(57) ABSTRACT

A terminal device includes a metal frame. At least two slots are disposed on a side of the metal frame, at least two antenna feedpoints are disposed on an inner side wall of the metal frame, and different antenna feedpoints in the at least two antenna feedpoints are located on side edges of different slots. A signal reflection wall is further disposed inside the terminal device, and a gap exists between the signal reflection wall and the at least two slots. The signal reflection wall is formed by a metal outer wall of a battery of the terminal device. The metal frame and the signal reflection wall are both electrically connected to a ground plate of the terminal device.

11 Claims, 6 Drawing Sheets

(51) Int. Cl.
*H01Q 19/10* (2006.01)
*H01Q 21/08* (2006.01)

(56) References Cited

U.S. PATENT DOCUMENTS

| | | | | |
|---|---|---|---|---|
| 2014/0184449 | A1 | 7/2014 | Dong et al. | |
| 2016/0112551 | A1 | 4/2016 | Hung et al. | |
| 2017/0346164 | A1* | 11/2017 | Kim | H04M 1/0266 |
| 2018/0212321 | A1* | 7/2018 | Yang | H01Q 13/103 |
| 2018/0261921 | A1* | 9/2018 | Ha | H01Q 1/243 |
| 2020/0106157 | A1* | 4/2020 | Tran | H01Q 1/2291 |

FOREIGN PATENT DOCUMENTS

| | | | |
|---|---|---|---|
| CN | 105762485 | A | 7/2016 |
| CN | 105789904 | A | 7/2016 |
| CN | 106229627 | A | 12/2016 |
| CN | 106329105 | A | 1/2017 |
| CN | 206134921 | U | 4/2017 |
| CN | 106972236 | A | 7/2017 |
| CN | 107331946 | A | 11/2017 |
| CN | 107834171 | A | 3/2018 |
| CN | 108075220 | A | 5/2018 |
| CN | 108093105 | A | 5/2018 |
| CN | 108110417 | A | 6/2018 |
| CN | 108183724 | A | 6/2018 |
| CN | 207624903 | U | 7/2018 |
| CN | 108987905 | A | 12/2018 |
| CN | 108987906 | A | 12/2018 |
| CN | 108987944 | A | 12/2018 |
| JP | 6293227 | B1 | 3/2018 |

OTHER PUBLICATIONS

First Office Action regarding Chinese Patent Application No. 201810818722.6, dated Feb. 6, 2020. Translation provided by Bohui Intellectual Property.

Second Office Action regarding Chinese Patent Application No. 201810818722.6, dated Aug. 26, 2020. Translation provided by Bohui Intellectual Property.

* cited by examiner

TERMINAL DEVICE

CROSS-REFERENCE TO RELATED APPLICATIONS

This application is a Bypass Continuation Application of PCT/CN2019/097216 filed on Jul. 23, 2019, which claims priority to Chinese Patent Application No. 201810818722.6 filed on Jul. 24, 2018, which are incorporated herein by reference in their entirety.

TECHNICAL FIELD

The present disclosure relates to the field of communications technologies, and more particularly to a terminal device.

BACKGROUND

With the rapid development of communications technologies, multi-antenna communication has become a mainstream and future development trend of terminal devices, and millimeter-wave antenna arrays are gradually introduced to terminal devices during this process.

SUMMARY

The embodiments of the present disclosure provide a terminal device, and the terminal device includes a metal frame. At least two slots are disposed on a side of the metal frame, at least two antenna feedpoints are disposed on an inner side wall of the metal frame, and different antenna feedpoints in the at least two antenna feedpoints are located on side edges of different slots. A signal reflection wall is further disposed inside the terminal device, a gap exists between the signal reflection wall and the at least two slots, and the signal reflection wall is formed by a metal outer wall of a battery of the terminal device. The metal frame and the signal reflection wall are both electrically connected to a ground plate of the terminal device.

BRIEF DESCRIPTION OF THE DRAWINGS

In order to describe technical solutions in embodiments of the present disclosure more clearly, the accompanying drawings to be used in the description of embodiments of the present disclosure will be introduced briefly below. Obviously, the accompanying drawings in the following description are merely some embodiments of the present disclosure, and a person of ordinary skill in the art may also obtain other drawings according to those drawings.

DETAILED DESCRIPTION

Technical solutions in embodiments of the present disclosure will be described clearly with reference to accompanying drawings in the embodiments of the present disclosure. Obviously, the described embodiments are merely some but not all the embodiments of the present disclosure. Other embodiments obtained on a basis of the embodiments of the present disclosure by a person of ordinary skill in the art shall be included in the protection scope of the present disclosure.

In the related art, a millimeter-wave antenna array is generally in a form of an independent antenna module, and thus an accommodating space needs to be provided for the independent antenna module in a terminal device, which may cause that the whole terminal device is large in volume and size, thereby resulting in a relatively low overall competitiveness of the terminal device.

Figure 1:
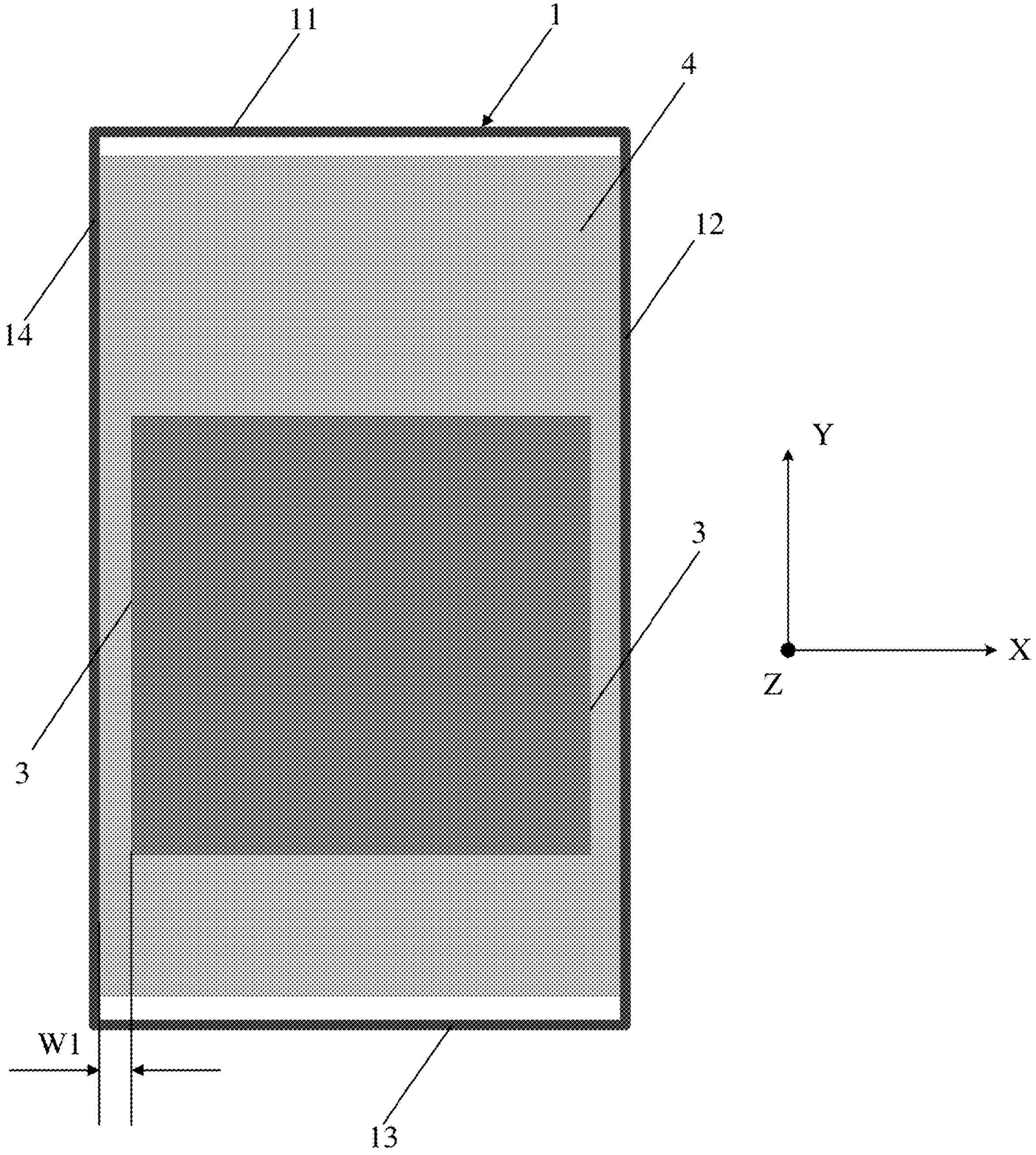
FIG. 1 is a schematic diagram showing a structure of a terminal device, in accordance with embodiments of the present disclosure.

Referring to FIG. 1, FIG. 1 is a schematic diagram showing a structure of a terminal device, in accordance with embodiments of the present disclosure. As shown in FIG. 1, the terminal device includes a metal frame 1, and at least two slots 15 are disposed on a side of the metal frame 1. At least two antenna feedpoints 2 are disposed on an inner side wall of the metal frame 1, and different antenna feedpoints 2 in the at least two antenna feedpoints 2 are located on side edges of different slots 15. A signal reflection wall 3 is further disposed inside the terminal device, and there is a gap between the signal reflection wall 3 and the at least two slots 15. The signal reflection wall 3 is formed by a metal outer wall of a battery of the terminal device. The metal frame 1 and the signal reflection wall 3 are both electrically connected to a ground plate 4 of the terminal device.

In this embodiment, the metal frame 1 may be a frame with a head portion and a tail portion connected or unconnected, and the metal frame 1 may include a first side 11, a second side 12, a third side 13 and a fourth side 14. The at least two slots 15 may be disposed to be on one side of the metal frame 1. Alternatively, two opposite sides of the metal frame 1 may be both provided with at least two slots 15. The slots 15 may be filled with air or a non-conductive material, or the like.

In this embodiment, at least two antenna feedpoints 2 are disposed on the inner side wall of the metal frame 1, and different antenna feedpoints 2 in the at least two antenna feedpoints 2 are located on side edges of different slots 15, so that it may be ensured that there are at least two slots 15 on a side of the metal frame 1 and each of which has an antenna feedpoint 2, and thus the at least two slots 15 may form a millimeter-wave antenna array. The antenna feedpoints 2 of the millimeter-wave antenna array are located on side edges of the slots 15, so that millimeter-wave signals may be led to the antenna feedpoints 2 of the millimeter-wave antenna array, and are radiated through the metal frame 1. Besides, the metal frame 1 can also receive millimeter-wave signals. Of course, it is optional that each slot 15 may be provided with an antenna feedpoint 2.

In this embodiment, due to existence of the signal reflection wall 3, the performance of the millimeter-wave antenna array may be enhanced, and the gain of the millimeter-wave antenna array may be improved. There is a gap between the signal reflection wall 3 and the at least two slots 15, and the gap may be filled with air, or some non-conductive materials, or the like. In this case, reference may be made to the gap W1 shown in FIG. 1, and W1 is greater than 0. A battery generally has a metal outer wall (a layer of metal coating on a surface of the battery), and thus the metal outer wall of the battery in the related art is used as the signal reflection wall 3, which makes it unnecessary to add additional materials, thereby saving the cost of the terminal device.

In this embodiment, the battery may be disposed above the ground plate 4, and the metal outer wall of the battery serves as the signal reflection wall 3 of the millimeter-wave antenna array. The ground plate 4 may be a circuit board or a metal housing, or the like. The metal frame 1 and the signal reflection wall 3 are both electrically connected to the ground plate 4 of the terminal device, so that the metal frame 1 and the signal reflection wall 3 may be grounded.

In this way, at least two slots 15 are disposed on a side of the frame of the terminal device, which is equivalent to forming a millimeter-wave antenna array, and which may save space for accommodating the millimeter-wave antenna array without occupying antenna spaces of other antennas, and may further reduce a volume of the terminal device, and thus an overall competitiveness of the terminal device is improved. Taking advantage of the structure of the terminal device as an antenna improves a communication effect, and a metal texture of the terminal device is not affected. And using the metal outer wall of the battery directly as the signal reflection wall 3 may enhance the performance of the millimeter-wave antenna array, improve the gain of the millimeter-wave antenna array, and optimize a radiation pattern of the antenna array. Besides, it is also unnecessary to add additional materials, which may save the cost of the terminal device. Moreover, the millimeter-wave antenna array is integrated with a communication antenna in the related art, such as a communication antenna in 2G, 3G, 4G, or sub 6G, which does not affect the communication quality of the communication antenna and the function of the terminal device.

In addition, for the design of a mainstream millimeter-wave antenna in the related art, it is generally difficult to show better antenna performance under a design of metal appearance, that is, it is difficult to support the design of metal appearance, and thus the competitiveness of the product is reduced. Such a design of the embodiment may better support the design of metal appearance, and may be compatible with a scheme that the appearance metal serves as other antennas, so as to improve the overall competitiveness of the product. The design of the embodiment solves a problem that the whole terminal device is large in volume and size, which is caused by that an accommodating space that needs to be provided for a millimeter-wave antenna in the terminal device. And a problem that it is difficult for the terminal device to support the design of metal appearance may also be solved.

In this embodiment, the terminal device may be a mobile phone, a tablet personal computer, a laptop computer, a personal digital assistant (PDA), a mobile Internet device (MID), a wearable device, etc.

Optionally, the antenna feedpoint 2 is located at a non-central position of a side edge of the slot 15.

Figure 2:
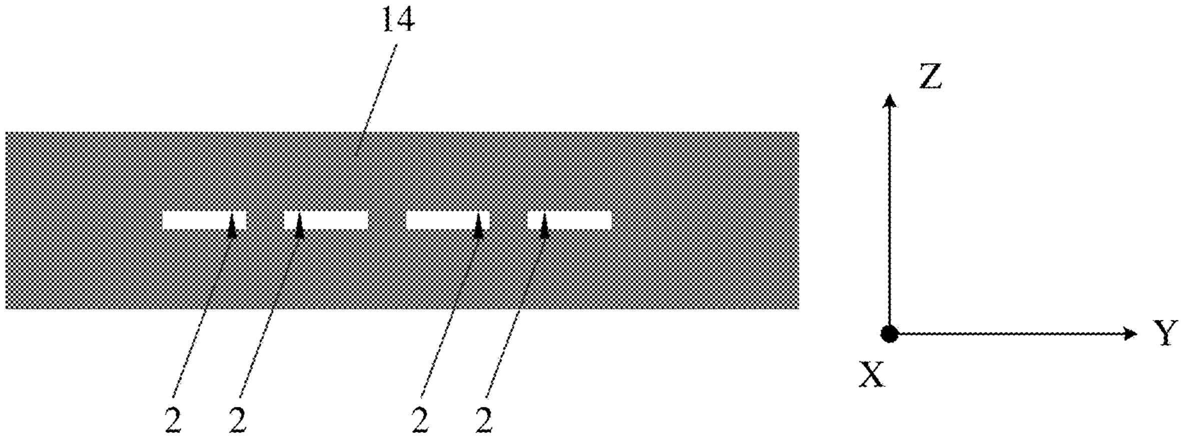
FIG. 2 is a schematic diagram showing arrangement positions of antenna feedpoints, in accordance with embodiments of the present disclosure.

In this implementation, the antenna feedpoint 2 is located at a non-central position of a side edge of the slot 15, so that the millimeter-wave antenna array may have better performance. To better understand the above arrangement, reference may be made to FIG. 2, and FIG. 2 is a schematic diagram showing arrangement positions of antenna feedpoints, in accordance with embodiments of the present disclosure. As shown in FIG. 2, there are at least four slots 15 on the fourth side 14, antenna feedpoints 2 of a first slot and a third slot from left to right are proximate to a right side of a the center of the slot 15, and antenna feedpoints 2 of a second slot and a fourth slot from left to right are proximate to a left side of the center of the slot 15, so that the millimeter-wave antenna array may have better performance. Of course, this is merely an example of one arrangement of the antenna feedpoints 2, and there may be some other arrangements besides this, and this embodiment is not limited thereto.

Optionally, the slot 15 is a rectangular slot, and a length direction of the slot 15 is the same as a length direction of the metal frame 1.

In this implementation, the length direction of the slot 15 is the same as the length direction of the metal frame 1, so that the slot 15 may be easily provided.

Optionally, the at least two slots 15 are arranged along the length direction of the metal frame 1.

In this implementation, the at least two slots 15 may constitute a slot group, and the slot group includes at least two slots 15. There may be at least two slot groups on the metal frame 1, such as a first slot group and a second slot group. The first slot group and the second slot group each include at least two slots 15, and the first slot group may be located on the second side 12 and the second slot group may be located on the fourth side 14. In this way, by providing slot groups on different sides, a beam coverage of the millimeter-wave antenna array may be further improved.

Optionally, each slot 15 is disposed opposite to the signal reflection wall 3.

In this implementation, each slot 15 is disposed opposite to the signal reflection wall 3, so that the signal reflection wall 3 may cover the slots 15 well, thereby facilitating better reflection of signals.

Optionally, a length of each slot 15 is the same, and a distance between any two adjacent slots 15 is the same.

Figure 3:
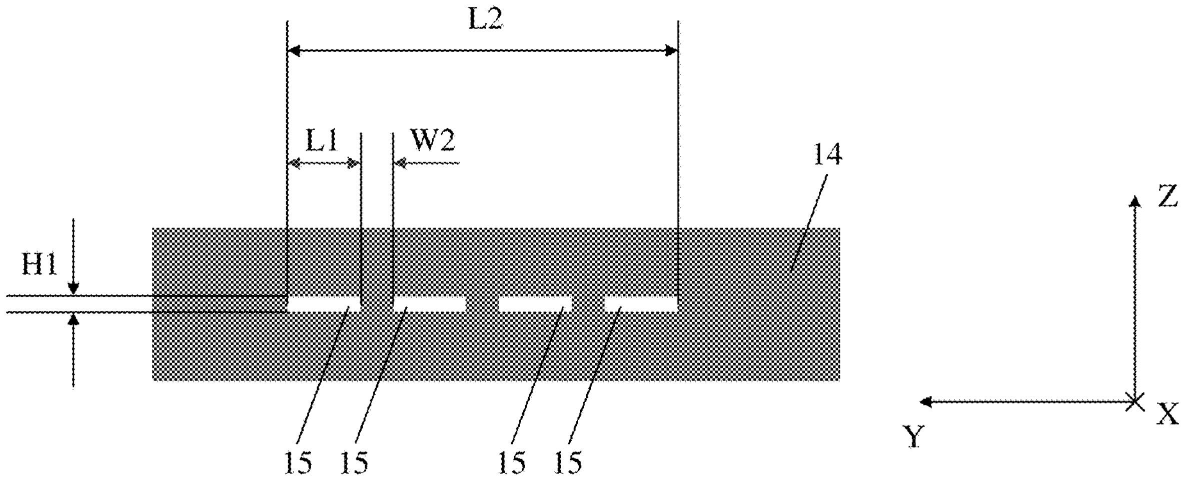
FIG. 3 is a schematic diagram showing a structure of a side of a metal frame, in accordance with embodiments of the present disclosure.
Figure 4:
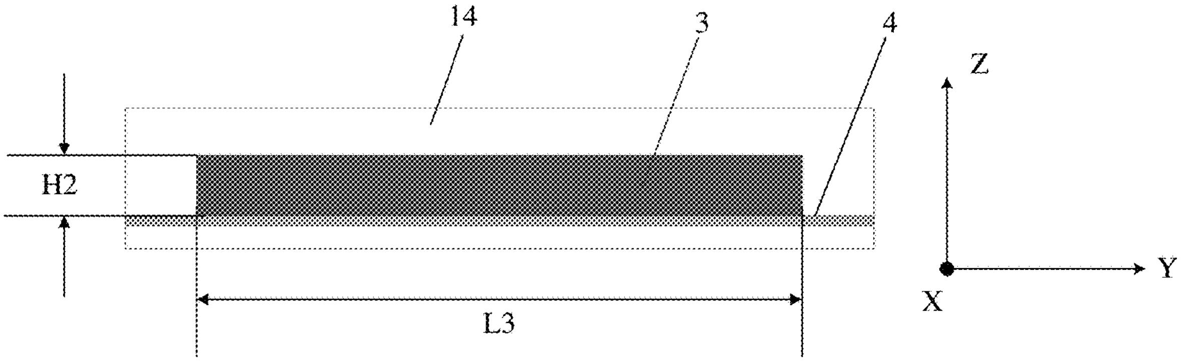
FIG. 4 is a schematic diagram showing a relative position between a signal reflection wall and a side of a metal frame, in accordance with embodiments of the present disclosure.

In this implementation, in order to better understand the above arrangement, reference may be made to FIGS. 3 and 4, and FIGS. 3 and 4 are both schematic diagrams showing relative positions between a signal reflection wall and a side of a metal frame, in accordance with embodiments of the present disclosure.

As it can be seen from FIG. 3, there are at least four slots 15 on the fourth side 14 of the metal frame 1, and each slot 15 is disposed opposite to the signal reflection wall 3. The length of the slot 15 is L1, and L1 may be approximately half of a wavelength corresponding to a center frequency of an operating frequency band of the millimeter-wave antenna. A width H1 of the slot 15 is not limited. A distance between edges of the slots 15 is W2, and the distance W2 may be determined by an isolation between two adjacent antennas and a beam scanning coverage angle of the millimeter-wave antenna array. A sum of a total length of the at least four slots 15 and a total length of distances between the at least four slots 15 is L2. As will be seen from FIG. 4 that a length of the battery is L3, so a length of the signal reflection wall 3 is L3. Optionally, L3 may be set to be greater than or equal to L2. In this way, the signal reflection wall 3 formed by the metal outer wall of the battery may cover the slots 15 well to better reflect signals.

Optionally, the distance between two adjacent slots 15 is determined by the isolation between two adjacent antennas and the beam scanning coverage angle of the antenna array.

In this implementation, the distance between two adjacent slots 15 is determined by the isolation between two adjacent antennas and the beam scanning coverage angle of the antenna array, so that the millimeter-wave signals may be better matched for operation.

Optionally, an upper edge of the signal reflection wall 3 is not lower than upper edges of the slots 15, and a lower edge of the signal reflection wall 3 is not higher than lower edges of the slots 15.

In this implementation, the upper edge of the signal reflection wall 3 is not lower than the upper edges of the slots 15, and the lower edge of the signal reflection wall 3 is not higher than the lower edges of the slots 15, so that the signal reflection wall 3 formed by the metal outer wall of the battery may cover the slots 15 well, thereby facilitating better reflection of signals.

In order to better understand the above arrangement, a reference may be made to FIGS. 3 and 4. In FIG. 3, the width of the slot 15 is H1; in FIG. 4, a thickness of the battery is H2. The battery and the slots 15 are on a same side of the ground plate 4, and H2 is greater than or equal to H1. In this way, it is possible to make the upper edge of the signal reflection wall 3 formed by the metal outer wall of the battery is not lower than the upper edges of the slots 15, and the lower edge of the signal reflection wall 3 is not higher than the lower edges of the slots 15. Therefore, the slots 15 may be covered well, which facilitates better reflection of signals.

Of course, in a case where the upper edge of the signal reflection wall 3 is not lower than the upper edges of the slots 15, and the lower edge of the signal reflection wall 3 is not higher than the lower edges of the slots 15, the sum of the total length of the slots 15 disposed on the same side of the metal frame 1 and the total length of distances between the slots 15 is made to be not greater than the length of the battery, so that the slots 15 is better covered to facilitate better reflection of signals.

Figure 5:
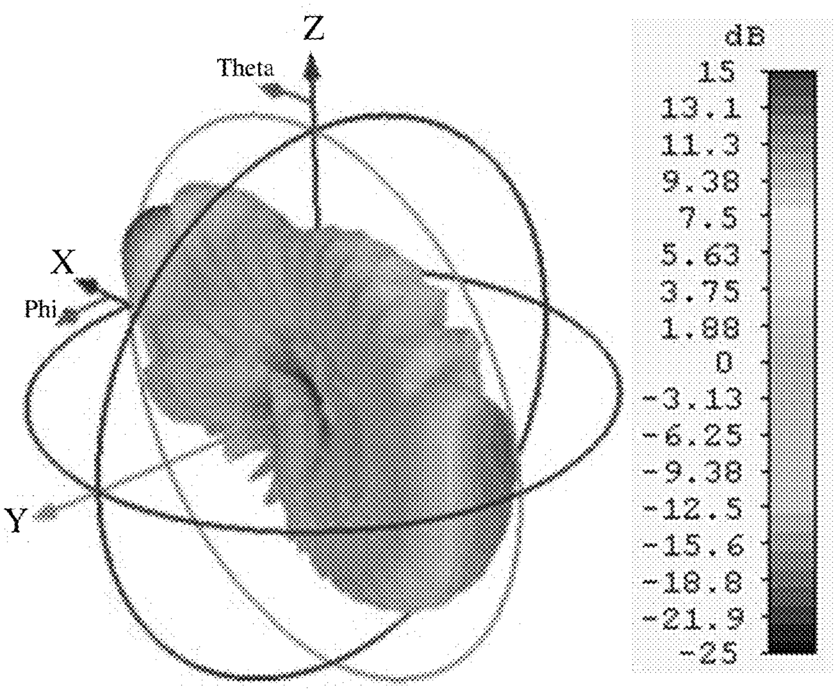
FIG. 5 is a schematic diagram of a radiation pattern, in accordance with embodiments of the present disclosure.
Figure 6:
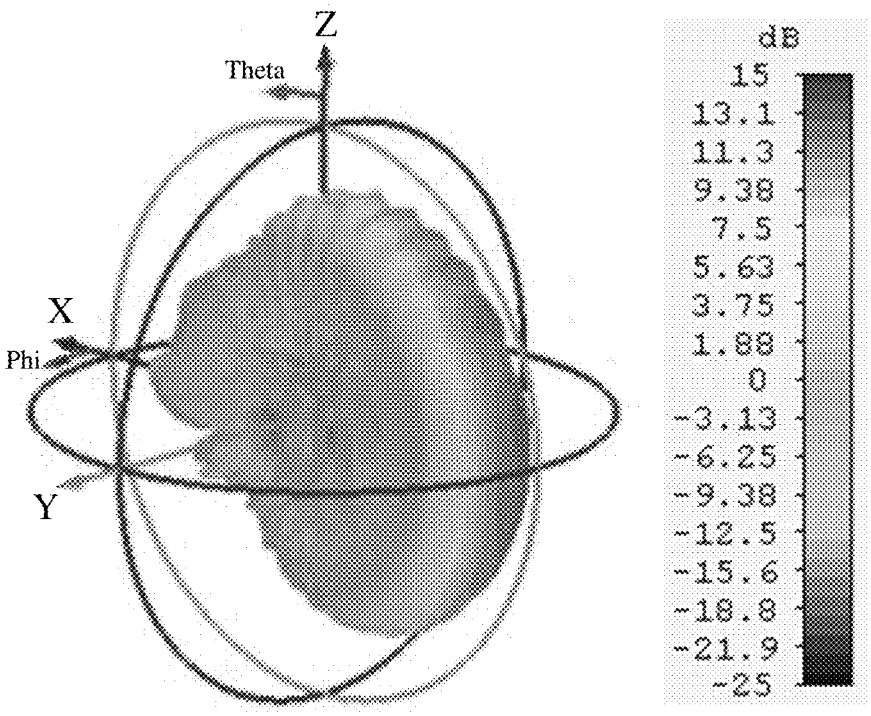
FIG. 6 is another schematic diagram of a radiation pattern, in accordance with embodiments of the present disclosure.

Referring to FIGS. 5 and 6, FIGS. 5 and 6 are both schematic diagrams of radiation pattern, in accordance with embodiments of the present disclosure. FIG. 5 is a schematic diagram of radiation pattern when there is no battery or the battery is far away from the millimeter-wave antenna array (e.g., a distance between the battery and the millimeter-wave antenna array is more than 5 times a length of a slot antenna unit). FIG. 6 is a schematic diagram of a radiation pattern of the millimeter-wave antenna array when the battery is disposed near the millimeter-wave antenna array. Wherein a ZY plane rotates towards the X axis, and an included angle between the ZY plane and the X axis is theta; a ZX plane rotates towards the Y axis, and an included angle between the ZX plane and the Y axis is Phi. Scales in FIGS. 5 and 6 show an increase in gain from the zero scale upwards and a decrease from the zero scale downwards.

In FIG. 5, gains in a positive direction and a negative direction of the X axis are larger, and a gain near the origin of coordinates is smaller. For FIG. 5, a gain of a back lobe (the positive direction of the X axis) is larger than a gain of a positive direction of the X axis in FIG. 6, and thus a beamwidth of a main lobe (the negative direction of the X axis) in FIG. 5 is narrower than a beamwidth of a main lobe (a negative direction of the X axis) in FIG. 6, and a gain of the main lobe in FIG. 5 is smaller than the gain of the main lobe in FIG. 6.

In FIG. 6, a gain in the negative direction of the X axis is larger, and a gain near the origin of coordinates is smaller. For FIG. 6, a gain of a back lobe (the positive direction of the X axis) is smaller than the gain of the positive direction of the X axis in FIG. 5, and thus the beamwidth of the main lobe (the negative direction of the X axis) in FIG. 6 is wider than the beamwidth of the main lobe (the negative direction of the X axis) in FIG. 5, and the gain FIG. 6 of the main lobe is larger than the gain of the main lobe in FIG. 5.

Figure 7:
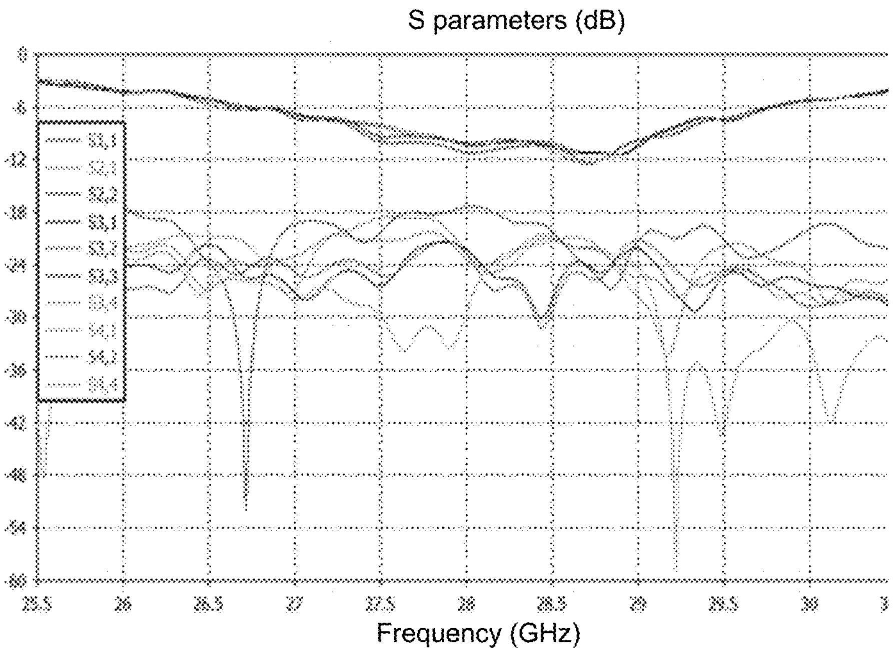
FIG. 7 is a schematic diagram of parameters of a slot group antenna array, in accordance with embodiments of the present disclosure.

Referring to FIG. 7, FIG. 7 is a parameter diagram of a slot group antenna array, in accordance with embodiments of the present disclosure. FIG. 7 uses a 28 GHz millimeter-wave antenna array as a design example, a length of a slot unit is 5.8 mm, and a distance between slots is 2.3 mm. FIG. 7 shows S parameters of the slot group antenna array, a bandwidth thereof may cover 26.75 GHz to 29.75 GHz (a return loss thereof is below −6 dB bandwidth), and the isolation between antennas is below 17 dB.

Optionally, two opposite sides of the metal frame 1 are both provided with at least two slots 15.

Figure 8:
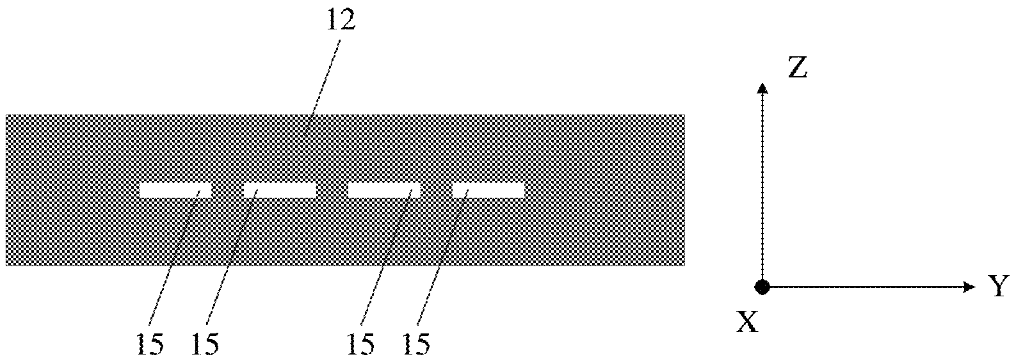
FIG. 8 is another schematic diagram showing a structure of a side of a metal frame, in accordance with embodiments of the present disclosure.
Figure 9:
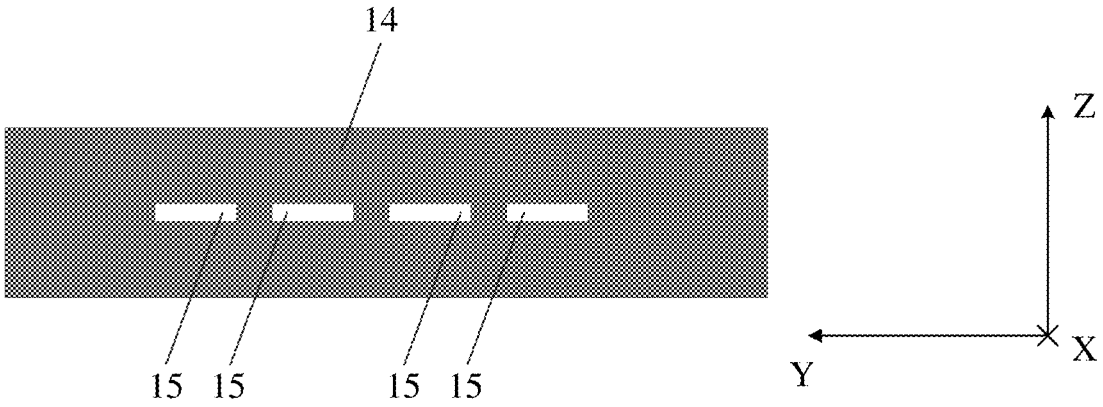
FIG. 9 is yet another schematic diagram showing a structure of a side edge of a metal frame, in accordance with embodiments of the present disclosure.

In this implementation, at least two slots 15 are disposed on each of the two opposite sides of the metal frame 1, so as to further improve the beam coverage of the millimeter-wave antenna array. In order to better understand the above arrangement, a reference may be made to FIGS. 8 and 9, and FIGS. 8 and 9 are both schematic diagrams showing a structure of a side of the metal frame, in accordance with embodiments of the present disclosure. A side in FIG. 8 is the second side 12, a side in FIG. 9 is the fourth side 14, and the second side 12 and the fourth side 14 are two opposite sides of the metal frame 1. At least four slots 15 are disposed on the second side 12, and a main lobe of a slot group constituted by the at least four slots 15 points to the positive direction of the X-axis; at least four slots 15 are disposed on the fourth side 14, and a main lobe of a slot group constituted by the at least four slots 15 points to the negative direction of the X axis, so that the beam coverage of the millimeter-wave antenna array may be improved.

Optionally, the slot 15 is a cross-shaped slot or an I-shaped slot.

In this implementation, the slot 15 is a cross-shaped slot or an I-shaped slot, so that various arrangements may be provided for the slots to make the slots have different performances. Of course, besides, some slots with other shapes may also be provided according to a tested performance result, and the embodiment is not limited thereto.

Optionally, the length of the slot 15 is determined according to a half wavelength corresponding to a center frequency of an operating frequency band of an antenna.

In this implementation, the length of the slot 15 is determined according to the half wavelength corresponding to the center frequency of the operating frequency band of the antenna, so that the millimeter-wave signals may be better matched for operation. The length of the slot 15 may be approximately the half wavelength corresponding to the center frequency of the operating frequency band of the antenna.

Optionally, the signal reflection wall 3 is a concave reflection curved surface; or the signal reflection wall is a convex reflection curved surface.

In this implementation, the signal reflecting wall 3 is a concave reflection curved surface or a convex reflection curved surface, which may optimize the radiation pattern of the millimeter-wave antenna array.

The terminal device in the embodiments of the present disclosure includes a metal frame 1 having at least one slot 15. The at least two slots 15 are disposed on a side of the metal frame 1, at least two antenna feedpoints 2 are disposed on an inner side wall of the metal frame 1, and different antenna feedpoints 2 in the at least two antenna feedpoints 2 are located on side edges of different slots 15. A signal reflection wall 3 is further disposed inside the terminal device, a gap exists between the signal reflection wall 3 and the at least two slots 15, and the signal reflection wall 3 is formed by a metal outer wall of a battery of the terminal device. The metal frame 1 and the signal reflection wall 3 are both electrically connected to a ground plate 4 of the terminal device. In this way, the metal frame 1 provided with the slots is equivalent to the millimeter-wave antenna array of the terminal device, and the metal frame 1 is also a radiating body of a communication antenna, so that the space accommodating the millimeter-wave antenna is saved, the volume of the terminal device may be reduced, and the design of metal appearance may be supported better. Furthermore, the design may be compatible with a scheme that the appearance metal serves as other antennas, and the overall competitiveness of the terminal device is improved.

It will be noted that the terms such as "include" and "comprise" or any other variation thereof herein are intended to cover non-exclusive inclusion, so that a process, a method, an article or an apparatus that includes a series of elements that not only includes those elements, but also includes other elements not explicitly listed or elements inherent to the process, the method, the article or the apparatus. In a case where there is no more limitation, an element defined by the phrase "including a . . . " does not exclude existence of other identical elements in a process, a method, an article, or an apparatus that includes the element.

The embodiments of the present disclosure are described above with reference to the accompanying drawings. However, the present disclosure is not limited to the above specific embodiments. The above specific embodiments are merely examples and are not restrictive. Under enlightenment of the present disclosure, a person of ordinary skill in the art may make a plurality of forms without departing from the spirit of the present disclosure and the protection scope of the claims, all of which shall be included in the protection scope of the present disclosure.

What is claimed is:

1. A terminal device, comprising:

a metal frame having at least two slots disposed in a side of the metal frame, at least two antenna feedpoints being disposed on an inner side wall of the metal frame, and different antenna feedpoints in the at least two antenna feedpoints being located on side edges of different slots; and a signal reflection wall disposed inside the terminal device, a gap existing between the signal reflection wall and the at least two slots, and the signal reflection wall being formed by a metal outer wall of a battery of the terminal device; wherein the metal outer wall is a metal sidewall of the battery proximate to the side of the metal frame in which the at least two slots are located, and the metal sidewall is a metal layer coating on a surface of the battery;

the metal frame and the signal reflection wall are both electrically connected to a ground plate of the terminal device; and each slot of the at least two slots is disposed opposite to the signal reflection wall.

2. The terminal device according to claim 1, wherein an antenna feedpoint is located at a non-central position of a side edge of each slot.

3. The terminal device according to claim 1, wherein each slot is a rectangular slot, and the slot and the metal frame have a same length direction.

4. The terminal device according to claim 1, wherein the at least two slots are arranged along a length direction of the metal frame.

5. The terminal device according to claim 4, wherein each of the slots has a same length, and there is a same distance between any two adjacent slots.

6. The terminal device according to claim 4, wherein a distance between two adjacent slots is determined by an isolation between two adjacent antennas and a beam scanning coverage angle of an antenna array.

7. The terminal device according to claim 4, wherein an upper edge of the signal reflection wall is not lower than upper edges of the at least two slots, and a lower edge of the signal reflection wall is not higher than lower edges of the at least two slots.

8. The terminal device according to claim 1, wherein at least two slots are provided in each of two opposite sides of the metal frame; and two opposite metal sidewalls of the battery proximate to the two opposite sides of the metal frame act as two signal reflection walls of slots disposed in the two opposite sides.

9. The terminal device according to claim 1, wherein each slot is a cross-shaped slot or an I-shaped slot.

10. The terminal device according to claim 1, wherein a length of each slot is determined according to a half wavelength corresponding to a center frequency of an operating frequency band of an antenna.

11. The terminal device according to claim 1, wherein the signal reflection wall is a concave reflection curved surface; or the signal reflection wall is a convex reflection curved surface.

* * * * *